United States Patent
Bubniak

[11] 3,888,459
[45] June 10, 1975

[54] FLOW CONTROL VALVE

[75] Inventor: William C. Bubniak, Troy, Mich.

[73] Assignee: General Motors Corporation, Detroit, Mich.

[22] Filed: Nov. 23, 1973

[21] Appl. No.: 418,602

[52] U.S. Cl. ............... 251/208; 251/305; 251/283
[51] Int. Cl. ....................... F16k 47/00; F16k 1/22
[58] Field of Search ..................... 251/283, 305, 208

[56] References Cited
UNITED STATES PATENTS

| | | | |
|---|---|---|---|
| 1,841,568 | 1/1932 | Bradley | 251/305 X |
| 2,174,547 | 10/1939 | Bailey | 251/305 X |
| 2,624,541 | 1/1953 | Ziebolz | 251/283 |
| 2,759,697 | 8/1956 | Harza | 251/305 X |
| 2,862,685 | 12/1958 | Lundberg | 251/305 |

Primary Examiner—Henry T. Klinksiek
Attorney, Agent, or Firm—Arthur N. Krein

[57] ABSTRACT

A flow control valve which consists of a valve housing including a valve body having a straight cross bore therethrough, a pair of end covers which seal the bored hole at the sides of the valve body and which also serve as a bearing means to rotatably support a rectangular valve plate rotatively positioned within the bored hole, the valve body having a first hole extending through the valve body from one exterior surface thereof to run out at the cross bore and a contoured hole of continuous profile extending from a surface of the valve body to run out at the cross bore, the included angle in the cross bore of the fluid flow path between these holes with the valve plate in full open position relative to these holes being less than 180°.

4 Claims, 4 Drawing Figures

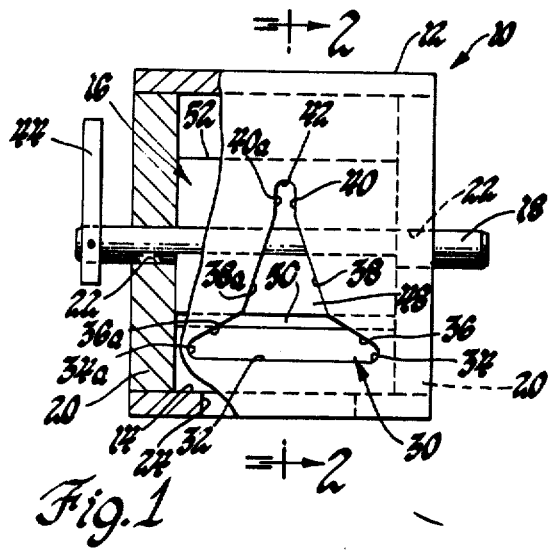

FLOW CONTROL VALVE

This invention relates to a flow control valve and, in particular, to a butterfly type valve having a scheduled valve throat area opening.

In certain fluid flow applications as, for example, those associated with the engine of an automotive vehicle, it is necessary to control the flow of fluid as a function of certain engine operating conditions or operating parameters. Thus, in certain of these applications, it is necessary to use a flow control valve of a type whose flow characteristics and, therefore, its flow rate can be so regulated as to provide the necessary flow rates required for a particular engine operating condition or operating parameter.

Conventional butterfly valves, because they are simple and reliable, are commonly used in automotive vehicle engines as, for example, to control airflow in the induction passage of an engine. As is well known, the flow area of such a standard conventional butterfly valve is the area of the duct which houses the valve plate of such a valve minus the projected area of the valve plate. Regardless of the shape of the butterfly valve plate, whether it is round, square, or rectangular, and it is contained in a conforming duct, such a standard butterfly valve will have flow areas of a characteristic shape. Some latitude can be obtained in modifying this characteristic shape by elongating the valve plate so that the valve closes at angles of less than 90° relative to the centerline of the duct. The degree of flexibility in varying the flow area by this latter defined means is, however, limited. Because of this limitation in a conventional butterfly valve, such a valve is impractical for use as a flow control valve in certain applications.

Shaped plug-type valves, which can be adapted to obtain flow area characteristics other than those obtained by the use of a standard butterfly valve, are also well known in the prior art. Although many design variations of shaped plug-valves are described in patents and in the literature, some basic principles apply to all valves in this category which are listed as follows:

a. The shape of a plug-valve, in combination with its position relative to an orifice, determines the flow area. Therefore, apart from shaping the plug-valve appropriately, it must be positioned accurately if the desired flow characteristic is to be achieved.

b. In its simplest form, plug-valves are not balanced against static pressure differences. Therefore, they can require relatively large operating forces. In some applications, a balance piston is used to minimize this problem.

c. The force versus displacement curve for such a plug-valve usually is non-linear. This in turn can affect the positioning accuracy of the valve when confronted with the use of a limited power actuator.

d. The greater the deviation from a linear flow characteristic for such a plug-valve, the greater the deviation from a uniformly tapered plug. With abrupt curvatures in the tapered plug, the flow area can shift from plane to plane rapidly to the point of compromising precise control of such a plug-valve.

In view of the above comments, it is apparent that, if the design requirements dictate the use of a valve having nonlinear flow area characteristics, a shaped plug-valve may not be the optimum type valve for use in such application, especially if the valve is to be operated by a limited power source, for example, a realistically sized vacuum actuator.

It is, therefore, the principal object of this invention to provide an improved butterfly valve whereby a rectangular valve plate rotatable in a cross bore of a valve housing is used to uncover a flow area in the valve formed by a contoured hole of continuous profile extending from one surface of the valve housing to run out at the cross bore in the housing, the profile of the contoured hole being of any predetermined size and shape, as desired, to obtain the desired flow area characteristics.

Another object of this invention is to provide an improved butterfly type valve having a simple, practical arrangement for varying the flow area characteristics obtainable by such a valve.

Still another object of this invention is to provide an improved butterfly valve of a configuration to provide a unique solution to flow control applications that cannot normally be resolved with conventional butterfly valve structures.

These and other objects of the invention are attained by means of flow control valve having a valve body with a straight-through bored hole in which a rectangular valve plate is rotatively positioned. Two end covers seal the bored hole at the sides of the valve body and also serve as bearings to support the rotatable valve plate. On one side of the body, there is a contoured hole of continuous profile which runs out at the housing bore, and a second hole which extends from a side of the valve body to run out at the cross bore. The valve plate is positioned so that one radial edge thereof moves relative to the contoured hole of continous profile from a closed position relative thereto to an open position relative to this contoured hole whereby a flow area is uncovered which is defined by a segment of the wall formed by the contoured hole in the housing and a radial edge of a valve plate. The scheduling of flow area to meet specific flow requirements is achieved by defining the shape of the contoured hole. The included angle in the cross bore in the valve body in the fluid flow path therein between the hole openings in the body with the valve plate positioned in a full open position relative to these holes being less than 180°.

For a better understanding of the invention, as well as other objects and further features thereof, reference is had to the following detailed description of the invention to be read in connection with the accompanying drawings, wherein:

FIG. 1 is a side elevational view of a flow control valve constructed in accordance with the invention showing an embodiment of the valve with a preferred profile for the contoured hole of continuous profile in the valve housing;

FIG. 2 is a sectional view taken along line 2—2 of FIG. 1;

FIG. 3 is a graph showing the relationship between the flow area and intake manifold for a conventional butterfly valve, a modified conventional butterfly valve and a flow control valve constructed in accordance with the invention with a discharge hole of a profile as shown in FIG. 1; and, FIG. 4 is a schematic sectional view, similar to FIG. 2, showing how the relationship between the inlet and discharge holes of the valve can be varied within prescribed limits.

Referring now to FIGS. 1 and 2, the flow control valve, generally designated 10, consists of a valve housing including a valve body 12 having a straight-through bored hole therein to provide an inner peripheral wall 14, the bore being of a suitable internal diameter to rotatably receive a parallel sided valve plate 16, suitably mounted on a shaft 18, for rotation therewith. In the embodiment illustrated, the valve plate 16 is a rectangular, flat valve plate. A pair of side plates or covers 20, suitably secured to the valve body 12, seal the bored hole at opposite sides of the valve housing and also serve to rotatably support the shaft 18 as by having suitable apertures 22 therethrough rotatably receiving the ends of shaft 18 whereby this shaft is positioned for rotation about an axis corresponding to the axis of the bore in the valve body 12. The inner peripheral wall 14 and the inner surfaces of covers 20 thus define a cylindrical cavity in the valve housing which includes the valve body 12 and covers 20.

As best seen in FIG. 2, the body 12 is provided with a hole or passage 24 extending from one surface of the housing to run out at the wall 14 of the cross bore, this hole 24 being, in the embodiment illustrated, the inlet opeining or passage of the valve and is, for example, of a conventional circular cross section of a diameter suitable for the particular application in which this valve is to be used.

In accordance with the invention, the valve body 12 is also provided with a contoured hole of continuous profile extending from one surface of the valve body to run out at the wall 14 of the cross bore, this hole, in the embodiment illustrated, being the outlet opening or passage of the valve.

The profile of contoured hole 30 can be of any desired configuration to provide for a desired flow area to provide the desired flow characteristics for a given application in which the flow control valve of the invention is to be used. In the embodiment of the contoured hole 30, as shown in FIG. 1, the profile of the hole 30 has been scheduled to provide the desired flow characteristics whereby this flow control valve can be used in an engine exhaust gas recirculation system of the type disclosed in copending U.S. Pat. application Ser. No. 381,754 filed July 23, 1973 in the name of Donald J. Pozniak entitled "Exhaust Gas Recirculation System with High Rate Valve," assigned to the same assignee as that of the subject patent application. The contoured hole 30 is thus profiled to provide a flow rate area in square inches which is continuously varied in accordance with the intake manifold vacuum of the engine, as shown by the curve for the flow control valve in FIG. 3.

In the above-identified application of the subject flow control valve, the profile of contoured hole 30 is formed with a base edge 32, parallel to the pivotal axis of the valve plate, and with oppositely curved sides 34 and 34a which merge with gradually inclined edge portions 36 and 36a, respectively. The inclined edge portions 36 and 36a each merge with an edge 38 and 38a, respectively, inclined at a steeper angle relative to the base edge 32 and the edges 36 and 36a, edges 38 and 38a then merging with edges 40 and 40a, respectively, that are at right angle to the base edge 32, these two edges 40 and 40a being joined together by a curved top edge 42. For more details regarding the dimensional relationship of the various edges of the contoured hole 30 and the overall size thereof, as used in a particular application, reference is made to the above-identified patent application Ser. No. 381,754, and, accordingly, these dimensions are not described herein since they are not deemed necessary for an understanding of the invention.

As best seen in FIG. 2, the valve plate 16 is centered on the shaft 18 to provide a balanced butterfly valve arrangement whereby the valve plate may be pivoted with a minimum power force through a suitable power actuator, not shown, operatively connected to the valve actuator lever 44 fixed to the shaft 18. With this arrangement, the pressure of incoming fluid through hole 24 would act on the face 46 of the valve plate 16 equally on opposite sides of the pivotal axis of the valve plate. In a similar manner, any fluid pressure on the backside 48 of the valve plate 16 would also be equally balanced about opposite sides of this valve plate from its pivotal axis.

The width of the valve plate 16 is such that the radially extending side edges thereof would have minimum sliding clearance relative to the interior surfaces of the end covers 20 to limit fluid flow therebetween while the radial outermost edges of the valve plate are similarly positioned relative to the inner peripheral surface of wall 14 formed by the bore in the valve body. One of these radial edges of the valve plate is defined as the flow control edge 50 while the other edge is defined as the sealing edge 52.

The rotative extent of travel of the valve plate 16 in a particular embodiment would be limited to a predetermined number of degrees, as desired, whereby the flow control edge 50 of this valve plate would be permitted to travel between a closed position and an open position relative to the contoured hole 30, these positions being shown schematically be the broken line positions of the valve plate 16 identified as positions A and B, respectively, in the embodiment shown in FIG. 2. At the same time the sealing edge 52 would only traverse over nonapertured portions of the wall 14 so as to prevent fluid flow around this edge of the valve. Accordingly, to permit such movement of the valve plate to effect proper control of fluid flow through the contoured hole 30, the angular extent C between the extreme outer edges of the hole 24 and of the contoured hole 30, in the fluid flow path in the bored opening of the valve body as defined by these openings in wall 14 and the face 46 of the valve plate, is thus less than 180°, as will become more apparent from the description of the embodiment of the flow control valve illustrated in FIG. 4, to be described.

Again referring to FIG. 2, the valve plate 16, in this embodiment, would rotate in a counterclockwise direction when moving from its closed position A to its fully opened position B relative to the contoured hole 30.

When the valve plate 16 is in a closed position A, no contoured hole 30 area is uncovered by the valve plate and thus fluid flow from the hole or passage 24 through the contoured hole 30 is prevented. As the valve plate 16 is rotated in a counterclockwise direction, to the position seen in FIG. 2, the control edge would uncover a portion of the contoured hole 30 to define a flow area therethrough. As seen in FIG. 1, a flow area is thus uncovered defined by a segment of the wall formed by the contoured hole 30 in the valve body 12 and the control edge 50 of the valve plate. It is apparent that the size of the uncovered area or flow area for a given valve plate angle and diameter of bore depends upon the average width of the opening. As the result of this, innumerable valve area-angle relationships can be obtained simply by incorporating the desired profile of the contoured hole 30 in the valve body. More specifically, any desired positive or zero slope flow area characteristic can be obtained by this means. Included as part of the overall flow area would be flow area as defined above of the contoured hole 30 and the leakage area around the valve and the flow are of a separate bypass, if desired, these last two area being constant for a particular valve design, as is well known.

As previously mentioned, the scheduling of fluid flow area to meet a specific flow requirement for a particular application is achieved by defining the shape or profile of the contoured hole 30, as desired. This is a relatively simple procedure, since the controlling orifice area uncovered by the control edge of the valve plate is always in a plane parallel to the continuous cross section of the contoured hole 30. Thus, this mechanism, as described, for controlling the flow area is analagous to the method used in a simple sliding plate valve in which a flat plate with a hole therethrough is uncovered by a second flat plate. However, in the arrangement of the subject flow control valve, the valve plate 16 is essentially pressure balanced so that the power requirements for positioning the valve plate are minimized, which would not be the case with a simple sliding plate valve.

Referring now to FIG. 3, the upper curve shown in this figure defines the variation in geometric flow area required and obtained with the subject flow control valve for an exhaust gas recirculation control system as disclosed in the above-identified patent application Ser. No. 381,754, these flow area requirements being plotted as a function of intake manifold vacuum for an internal combustion engine.

The lower dotted line curve in this figure defines the flow area of a conventional butterfly valve also plotted as a function of intake manifold vacuum, this flow area being the area of the duct which houses the valve plate minus the projected area of the valve plate. By elongating the valve plate of a conventional butterfly valve so that the valve closes at angles of less than 90° relative to the centerline of the duct, the characteristic shape of the flow area of the conventional butterfly valve can be varied as shown by the shaded area in FIG. 3. From a comparison of the curve for a conventional butterfly valve and the shaded area of a modified conventional butterfly valve, as compared to the curve of the subject flow control valve, it is apparent that a conventional butterfly valve, as previously known, would not be acceptable for use in certain applications, such as the exhaust gas recirculation system disclosed in the above-identified U.S. Pat. application Ser. No. 381,754.

In the embodiment of the flow control valve shown in FIGS. 1 and 2, the hole 24 and the contoured hole 30 are shown as positioned as substantially right angles to each other and extending from the bottom and a side of the valve body. However, it is to be realized that the position of these holes relative to the outer surfaces of the valve body can be chosen, as desired, it only being necessary that the radial extent in the bore of the valve body between the hole 24 and the contoured hole 30, through the wall 14, in the flow path portion between these holes as controlled by the valve plate, be less than 180°, as previously described.

Thus, for example, in the embodiment illustrated in FIG. 4, where like numerals indicate like parts, the hole or passage 24 is curved within the valve body 12 so that this hole extends from one side of the valve body into the bore therein forming wall 14, while the hole 30, which would be the contoured hole 30, of a suitable profile, extends from the opposite side of the valve body to extend into the bored hole therein. As can be seen in this figure, the angular extent between these holes is just sufficiently less than 180°, whereby, as the valve plate 16 as it rotates from the closed position shown in solid line relative to the contoured hole to its open position shown in broken line, its sealing edge will always traverse a non-apertured portion of the inner peripheral wall 14 in the valve body formed by the bore therein.

It is to be realized that although the contoured hole 30, shown as the discharge passage from the valve body, flow through which is controlled by the valve plate 16, it may be used as the inlet passage for the valve and, of course, then the hole or passage 24 would serve as the outlet passage.

In addition, since it is apparent that the subject flow control valve would be connected to suitable intake and discharge ducts, in communication with the passage 24 and contoured hole 30, respectively, with reference to FIGS. 1 and 2, the description of the contoured hole 30 as being of continuous profile merely defines the critical profile portion of the contoured hole closely adjacent to the wall 40. Thus, for example, with reference to FIG. 2, the flow path downstream of a line tangential to the arc of the wall 14 and at right angle to the contoured wall of the contoured hole 30 could be enlarged and need not be contoured. However, for ease and accuracy in manufacturing, it is preferable to make the contoured hole 30 of continuous profile from a surface of the valve body to the wall 14 defined by the through bore in the valve body 12.

From the above description, it is apparent that while the subject flow control valve is essentially a butterfly valve, it is a valve in which the flow area can be scheduled, as desired, to meet the flow requirements of a given application.

What is claimed is:

1. A flow control valve including a valve body having a circular cross bore therethrough, side covers secured to opposite sides of said valve body to enclose said cross bore, a contoured hole of continuous profile extending from one surface of said valve body to run out at said cross bore, said contoured hole in cross section being of a predetermined scheduled area configuration, a hole extending from a surface of said valve body to run out at said cross bore, a shaft journalled in said side covers and extending through said cross bore concentrically therewith, a rectangular valve plate fixed to said shaft for rotation in said cross bore about the axis of rotation of said shaft for movement between a closed position and a full open position relative to said contoured hole, the included angle in the cross bore between said contoured hole and said hole when said valve plate is in said full open position being less than 180°, said valve plate when in an open position defining with said contoured hole a flow area, the size of which increases at a predetermined fixed rate relative to the rotative angle of said valve plate as determined by the predetermined scheduled area configuration of said contoured hole.

2. A flow control valve including housing means having an enclosed cylindrical cavity therein of a predetermined axial length defined by an annular inner peripheral wall and oposed side walls in said housing means, a first hole extending from an outer surface of said housing means through said inner peripheral wall, a second hole, contoured and of continuous profile, extending from an outer surface of said housing means through said inner peripheral wall, the cross section of said second hole defining a predetermined scheduled area, a shaft rotatably journalled in said housing means to extend through said cylindrical cavity concentric therewith, a flat valve plate of a length and width corresponding to the diameter and length of said cylindrical cavity fixed to said shaft for rotation in said cylindrical cavity about the axis of rotation of said shaft whereby one radial edge of said valve plate is moved between a closed position and a full open position relative to said second hole, the angular spacing between the intersection of said first hole and said second hole with said inner peripheral wall being such that, as said valve plate is rotated between said closed position and said open position, the opposite radial edge of said valve plate will always be in sealing relationship to non-apertured portions of said inner peripheral wall.

3. A flow control valve including housing means having an enclosed cylindrical cavity therein of a predetermined diameter and of a predetermined axial length defined by an annular inner peripheral wall and opposed side walls in said housing means, a first hole extending from an outer surface of said housing means to run out at said inner peripheral wall, a contoured hole of continuous profile and of a predetermined scheduled area in cross section extending from an outer surface of said housing means to run out at said inner peripheral wall, a shaft rotatably journalled in said housing means and extending coaxially through said cylindrical cavity, a valve plate within said cylindrical cavity fixed to said shaft for rotation therewith about the axis of rotation of said shaft whereby one radial edge of said valve plate is moved between a closed position and a full open position relative to said contoured hole, said valve plate being of a length and width complementary to the diameter and length of said cylindrical cavity, both said first hole and said contoured hole extending through said inner peripheral wall on less than one-half of the circumferential length of said inner peripheral wall on the flow side of said valve plate whereby as said one radial edge of said valve plate traverses over said contoured hole as said valve plate is moved from said closed position to said full open position, the opposite radial edge of said valve plate will traverse over only non-aperture portions of said inner peripheral wall, said predetermined scheduled area in cross section of said contoured hole being as desired, whereby, as said one radial edge of said valve plate traverses over said contoured hole as said valve plate is moved toward said full open position, a flow area is provided, the size of which increases at a predetermined rate, as desired, relative to the opening angular movement of said valve plate.

4. A flow control valve including a valve body having a straight-through annular bored hole therein, side covers fixed to opposite sides of said valve body to seal said bored hole at said sides of said valve body, a shaft extending coaxially through said bored hole and rotatably journalled in said side covers, a valve plate rotatably positioned in said bored hole and fixed to said shaft for rotation about the axis of rotation of said shaft, an inlet passage in said valve body which runs out at said bored hole, a contoured outlet passage of continuous profile in said valve body which runs out at said bored hole, the cross section of said contoured outlet passage being of a predetermined scheduled area profile, the included run out angle of said inlet passage and said contoured outlet passage into said bored hole being less than one hundred eighty degrees, said valve plate being rotatable in said bored hole whereby a radial edge of said valve plate is moved between a closed position relative to said contoured outlet passage to a full open position relative to said contoured outlet passage, the flow area from said valve body as said radial edge is moved between said closed position to said full open position being defined by a segment of the wall in said valve body formed by said contoured outlet passage therein and said radial edge of said valve plate, said flow area being in a plane parallel to the continuous cross section of said contoured outlet passage with a predetermined scheduled flow area for each incremental angular movement of said valve plate.

* * * * *